(12) United States Patent
Soga

(10) Patent No.: US 8,191,694 B2
(45) Date of Patent: Jun. 5, 2012

(54) LOCK-UP CLUTCH HYDRAULIC PRESSURE SUPPLY APPARATUS

(75) Inventor: Yoshinobu Soga, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 297 days.

(21) Appl. No.: 12/311,116

(22) PCT Filed: Jan. 11, 2008

(86) PCT No.: PCT/IB2008/000051
§ 371 (c)(1),
(2), (4) Date: Mar. 19, 2009

(87) PCT Pub. No.: WO2008/084385
PCT Pub. Date: Jul. 17, 2008

(65) Prior Publication Data
US 2010/0018822 A1    Jan. 28, 2010

(30) Foreign Application Priority Data
Jan. 12, 2007  (JP) .................................. 2007-004539

(51) Int. Cl.
*F16D 33/16* (2006.01)
(52) U.S. Cl. ....................... 192/3.3; 192/3.33; 192/85.63
(58) Field of Classification Search .................. 192/3.29, 192/3.3, 3.33, 85.63, 109 F
See application file for complete search history.

(56) References Cited

U.S. PATENT DOCUMENTS

| | | | | |
|---|---|---|---|---|
| 3,730,315 A | * | 5/1973 | Annis et al. | 192/3.3 |
| 3,977,502 A | * | 8/1976 | Chana | 192/3.3 |
| 4,561,528 A | * | 12/1985 | Sugano | 192/3.3 X |
| 4,648,423 A | | 3/1987 | Henken | |
| 4,664,235 A | * | 5/1987 | Yokoyama et al. | 192/3.29 |
| 4,880,090 A | * | 11/1989 | Ando | 192/3.3 |
| 4,930,372 A | * | 6/1990 | Sugano | 192/3.3 X |
| 4,966,263 A | * | 10/1990 | Hayasaki | 192/3.3 |
| 4,998,604 A | * | 3/1991 | Vukovich et al. | 192/3.3 |
| 5,050,715 A | * | 9/1991 | Itoh et al. | 192/3.3 |
| 5,082,095 A | * | 1/1992 | Imamura | 192/3.3 |
| 5,086,894 A | * | 2/1992 | Iizuka et al. | 192/3.29 |
| 5,211,083 A | * | 5/1993 | Hattori et al. | 192/3.3 X |
| 5,339,935 A | * | 8/1994 | Ishii et al. | 192/3.3 |
| 5,626,536 A | * | 5/1997 | Kono et al. | 192/3.3 X |
| 5,934,427 A | * | 8/1999 | Takagi | 192/3.3 |
| 6,499,577 B2 | * | 12/2002 | Kitamoto et al. | 192/85.63 |
| 7,003,388 B2 | * | 2/2006 | Nakamura | 192/3.29 X |

FOREIGN PATENT DOCUMENTS

| | | |
|---|---|---|
| EP | 1 403 566 A2 | 3/2004 |
| JP | A-07-127730 | 11/1993 |
| JP | A-07-127730 | 5/1995 |
| JP | A-2001-055968 | 3/2000 |
| JP | A-2001-055968 | 2/2001 |

* cited by examiner

*Primary Examiner* — Gregory Binda
*Assistant Examiner* — Matthieu Setliff
(74) *Attorney, Agent, or Firm* — Oliff & Berridge, PLC

(57) ABSTRACT

A lock-up control valve (550) selectively applies secondary pressure P (L/U) to the apply side hydraulic chamber of a torque converter (200) or to the release side hydraulic chamber thereof. The lock-up control valve (550) has a valve element (600), a first port (611), a second port (612), a third port (613), a fourth port (614), and a drain port (616). The valve element (600) has a first land (601) and a second land (602). The diameter of the second land (602) is larger than that of the first land (601).

10 Claims, 3 Drawing Sheets

LOCK-UP CLUTCH HYDRAULIC PRESSURE SUPPLY APPARATUS

BACKGROUND OF THE INVENTION

1. Field of the Invention

The invention relates to a lock-up clutch hydraulic pressure supply apparatus, and in particular, it relates to a lock-up clutch hydraulic pressure supply apparatus that reduces the current used to drive an electromagnetic valve.

2. Description of the Related Art

In vehicles, a torque converter is provided between an engine and an automatic transmission. In order to improve the torque transfer efficiency, some torque converters are provided with a lock-up clutch. A lock-up clutch is typically controlled using the hydraulic pressure output from an electromagnetic valve. In response to the hydraulic pressure being output from the electromagnetic valve, the lock-up clutch is switched from one of the released state and the applied state to the other.

When the electromagnetic valve continues to be energized, the electrical power consumption is large and it therefore reduces the fuel economy. To counter this, technologies have been proposed which improve the fuel economy by reducing the current used to drive the electromagnetic valve.

Japanese Patent Application Publication (No. 07-127730) describes a solenoid control apparatus for a vehicle lock-up clutch. In order to improve the fuel economy, this solenoid control apparatus maintains the lock-up clutch in the applied state by driving a linear solenoid (electromagnetic valve) with a reduced current. More specifically, when establishing each control mode of the lock-up clutch, that is, the applied mode, the released mode, the slip mode, and the fast-released mode, the solenoid control apparatus drives a particular solenoid with a drive current Isol. The drive current Isol is set within a range that satisfies IsolA<Isol<IsolB in the slip mode, IsolA>Isol in the applied mode, and IsolB<Isol in the fast-released mode. The solenoid control apparatus has a determination portion and a setting portion. The determination portion determines based on the operation state of the vehicle whether the vehicle is likely to be stopped. When it is determined that the vehicle is likely to be stopped, the setting portion sets the drive current Isol to a level close to the lower limit value IsolA of the slip mode, and when it is determined that the vehicle is not likely to be stopped, the setting portion sets the drive current Isol to zero or to a level near zero.

According to this solenoid control apparatus, as described above, when it is determined that the vehicle is not likely to be stopped, the drive current is set to the level near zero, and therefore the power consumption decreases accordingly. As such, the electrical power consumption is reduced.

However, the above-described reduction of the drive current to the electromagnetic valve can be accomplished only when the current to the electromagnetic valve is lower than IsolA, that is, when the electromagnetic valve is not required to output hydraulic pressure. Therefore, when the current to the electromagnetic valve can not be reduced to the level close to zero, that is, when the electromagnetic valve is required to output hydraulic pressure, the above-described reduction of the drive current to the electromagnetic valve can not be accomplished.

SUMMARY OF THE INVENTION

The invention provides a lock-up clutch hydraulic pressure supply apparatus that reduces the current used to drive an electromagnetic valve when the electromagnetic valve is outputting hydraulic pressure.

An aspect of the invention relates to a lock-up clutch hydraulic pressure supply apparatus. This apparatus has: an electromagnetic valve that outputs a hydraulic pressure such that the larger the current supplied to the electromagnetic valve, the higher the hydraulic pressure; and a switch valve having a valve element that is moved, in response to the hydraulic pressure being supplied from the electromagnetic valve, from a first position at which the supplied hydraulic pressure is sent from the switch valve to the lock-up clutch so as to establish one of an applied state and a release state of the lock-up clutch to a second position at which the supplied hydraulic pressure is sent from the switch valve to the lock-up clutch so as to establish the other of the applied state and the released state of the lock up clutch. The area of the switch valve on which the hydraulic pressure supplied from the electromagnetic valve acts when the valve element of the switch valve is at the second position is larger than the area of the switch valve on which the hydraulic pressure supplied from the electromagnetic valve acts when the valve element of the switch valve is at the first position.

According to the lock-up clutch hydraulic pressure supply apparatus described above, in response to hydraulic pressure being supplied from the electromagnetic valve that outputs hydraulic pressure when energized, the valve element of the switch valve moves from the first position at which the supplied hydraulic pressure is sent from the switch valve to the lock-up clutch so as to establish one of the applied state and the release state of the lock-up clutch to the second position at which the supplied hydraulic pressure is sent from the switch valve to the lock-up clutch so as to establish the other of the applied state and the released state of the lock up clutch, and the area of the switch valve on which the hydraulic pressure supplied from the electromagnetic valve acts when the valve element of the switch valve is at the second position is larger than the area of the switch valve on which the hydraulic pressure supplied from the electromagnetic valve acts when the valve element of the switch valve is at the first position. As such, the hydraulic pressure needed to maintain the valve element of the switch valve at the second position decreases, and therefore the hydraulic pressure that needs to be output from the electromagnetic valve decreases accordingly. Thus, the lock-up clutch hydraulic pressure supply apparatus described above reduces the current needed when the electromagnetic valve is outputting hydraulic pressure.

The above-described lock-up clutch hydraulic pressure supply apparatus may be such that the one of the applied state and the released state of the lock-up clutch is the applied state and the other of the applied state and the released state of the lock-up clutch is the released state.

Further, the above-described lock-up clutch hydraulic pressure supply apparatus may be such that the valve element of the switch valve has a first land on which the hydraulic pressure supplied from the electromagnetic valve acts when the valve element of the switch valve is at the first position and when the valve element of the switch valve is at the second position and a second land on which the hydraulic pressure supplied from the electromagnetic valve acts when the valve element of the switch valve is at the second position. The diameter of the second land may be larger than the diameter of the first land.

According to the structure described above, when the valve element of the switch valve is at the second position, the hydraulic pressure acts on the second land as well as on the first land. Thus, the area of the switching valve on which the hydraulic pressure acts when the valve element of the switch valve is at the second position is larger than the area of the switching valve on which the hydraulic pressure acts when the valve element of the switch valve is at the first position.

The above-described lock-up clutch hydraulic pressure supply apparatus may further include means for making the current supplied to the electromagnetic valve for maintaining the valve element at the second position smaller than the current supplied to the electromagnetic valve for switching the valve element from the first position to the second position.

According to the structure described above, the current used to maintain the valve element of the switch valve at the second position can be made lower than the current used to move the valve element of the switch valve from the first position to the second position, and this reduces the power consumption and thus improves the fuel economy.

The above-described lock-up clutch hydraulic pressure supply apparatus may be such that the switch valve has: a first port to which the hydraulic pressure is supplied from the electromagnetic valve when the valve element of the switch valve is at the first position and when the valve element is at the second position; and a second port to which the hydraulic pressure is supplied from the electromagnetic valve when the valve element is at the second position.

Further, the switch valve may have a space between the first land and the second land. In this case, the above-described lock-up clutch hydraulic pressure supply apparatus may be such that when the valve element of the switch valve is at the first position, the space is opened to the atmosphere, and as the hydraulic pressure is supplied from the electromagnetic valve, the hydraulic pressure acts on the first land via the first port, and such that when the valve element of the switch valve is at the second position, as the hydraulic pressure is supplied from the electromagnetic valve, the hydraulic pressure is supplied to the space via the second port so that the hydraulic pressure acts on the first land and the second land.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF AN EMBODIMENT

Hereinafter, an example embodiment of the invention will be described with reference to the drawings. In the following description, like elements and components are denoted by like numerals. Because the functions of such like elements and components are the same as each other, detailed descriptions on them will not be repeated.

First, the configuration of a vehicle power train incorporating a hydraulic pressure supply apparatus according to an example embodiment of the invention will be described with reference to FIG. 1.

Figure 1:
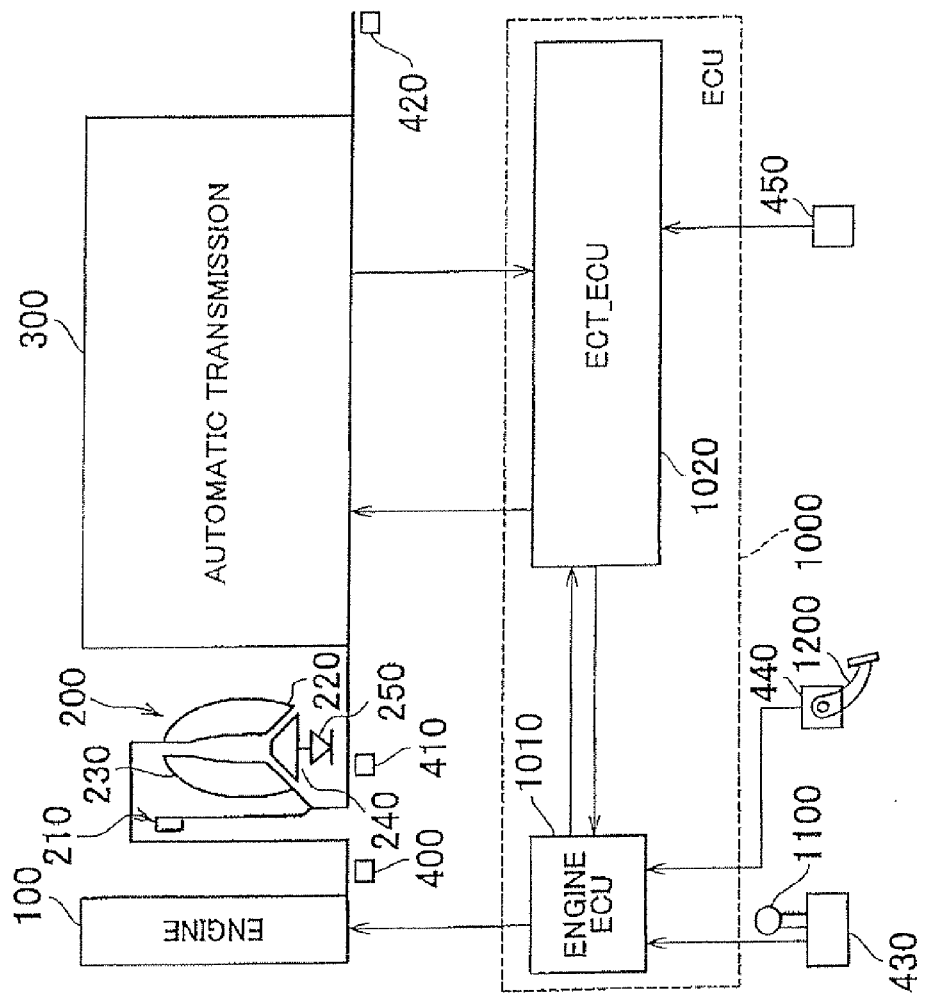
FIG. 1 is a view showing the overall configuration of a vehicle power train incorporating a hydraulic pressure supply apparatus according to an example embodiment of the invention.

Referring to FIG. 1, the vehicle power train is constituted of an engine 100, a torque converter 200, an automatic transmission 300, and an ECU (Electronic Control Unit) 1000.

The output shaft of the engine 100 is connected to the input shaft of the torque converter 200. The engine 100 and the torque converter 200 are coupled with each other via a rotational shaft. Thus, the rotation speed NE of the output shaft of the engine 100 (engine speed NE), which is detected by an engine speed sensor 400, and the rotation speed of the input shaft of the torque converter 200 (pump rotation speed) are equal to each other.

The torque converter 200 is constituted of a lock-up clutch 210 used to connect the input shaft and the output shaft of the torque converter 200 directly, a pump impeller 220 provided on the input shaft side, a turbine runner 230 provided on the output shaft side, a one-way clutch 250, and a stator 240 that exerts a torque amplification effect.

The torque converter 200 and the automatic transmission 300 are connected to each other via a rotational shaft. A rotation speed NT of the output shaft of the torque converter 200 (turbine speed NT) is detected by a turbine speed sensor 410. A rotation speed NOUT of the output shaft of the automatic transmission 300 is detected by an output shaft rotation speed sensor 420.

The automatic transmission 300 may either be a multi-speed transmission constituted of planetary gearsets or a CVT (Continuously Variable Transmission) that continuously changes its speed ratio.

The ECU 1000 for controlling the power train configured as described above includes an engine ECU 1010 that controls the engine 100 and an ECT (Electronic Controlled Transmission)-ECU 1020 that controls the automatic transmission 300.

The ECT-ECU 1020 receives the output signals of the turbine speed sensor 410 that indicate the turbine speed NT and the output signals of the output shaft rotation speed sensor 420 that indicate the output shaft rotation speed NOUT. Further, the ECT-ECU 1020 receives, via the engine ECU 1010, the output signals of the engine speed sensor 400 indicating the engine speed NE, the output signal of a throttle position sensor indicating the throttle opening degree, the output signals of a shift position sensor 430 indicating the position of a shift lever 1100, the output signals of an accelerator sensor 440 indicating the depression of an accelerator pedal 1200, the output signals of a vehicle speed sensor 450 indicating the vehicle speed. Based on these signals, the ECT-ECU 1020 controls the state of the lock-up clutch 210, the speed ratio of the automatic transmission 300, etc.

Figure 2:
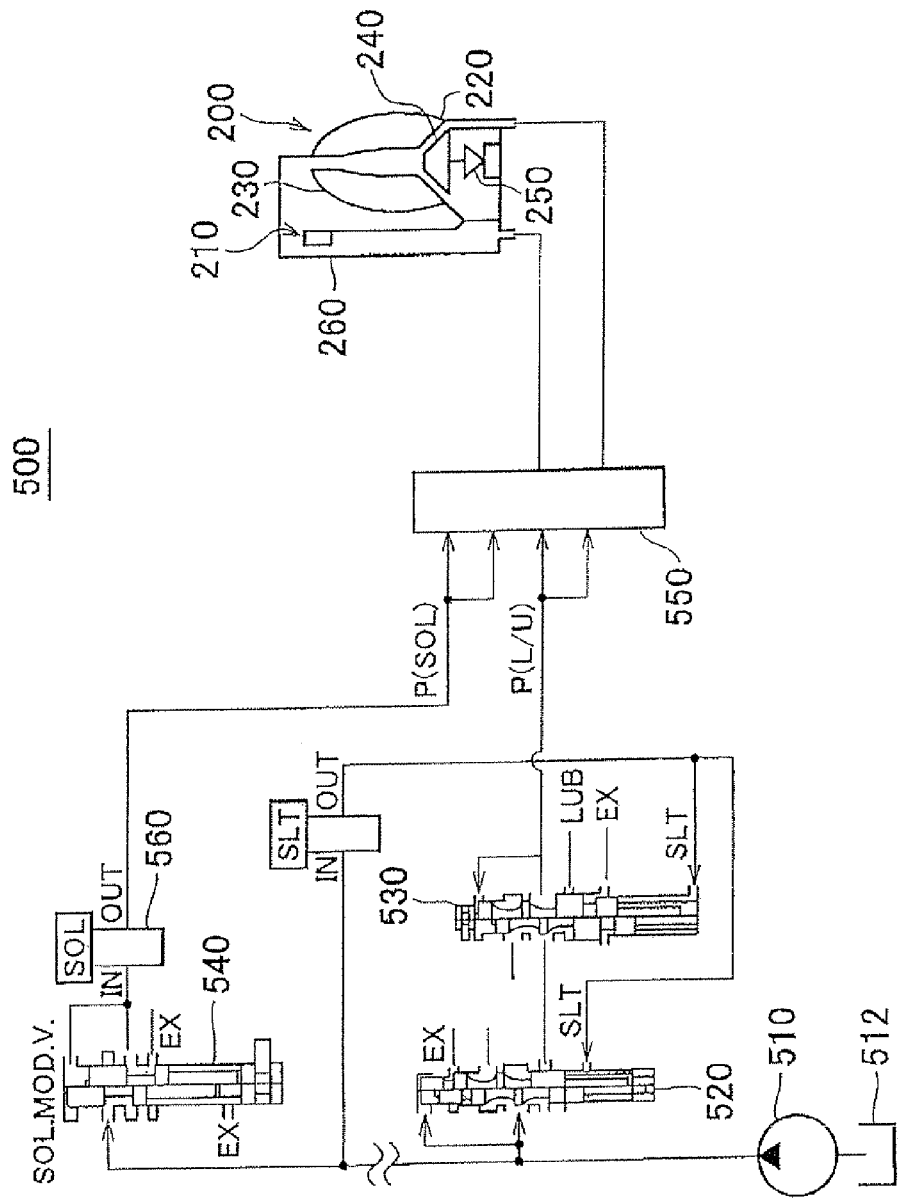
FIG. 2 is a view showing the hydraulic circuit of the hydraulic pressure supply apparatus of the example embodiment of the invention.

Next, a hydraulic circuit 500 that adjusts the hydraulic pressure supplied to the torque converter 200 to control the state of the lock-up clutch 210 will be described with reference to FIG. 2.

The hydraulic circuit 500 involves an oil pump 510, a primary regulator valve 520, a secondary regulator valve 530, a solenoid modulator valve 540, and a lock-up control valve 550.

The oil pump 510 is coupled with the crankshaft of the engine 100. The rotation of the crankshaft drives the oil pump 510 to draw the ATF from an oil pan 512, thus producing hydraulic pressure. The hydraulic pressure produced at the oil pump 510 is then adjusted by the primary regulator valve 520, whereby a line pressure is obtained.

Excess hydraulic fluid that has been discharged from the primary regulator valve 520 enters the secondary regulator valve 530, and a secondary pressure P (L/U) is produced by the secondary regulator valve 530.

The solenoid modulator valve 540 produces a solenoid modulator pressure using the line pressure as the base pressure. The produced solenoid modulator pressure is supplied to the solenoid valve 560.

A solenoid valve 560 outputs a hydraulic pressure P (SOL) corresponding to a command duty value issued from the ECT-ECU 1020, that is, the current supplied from the ECT-ECU 1020 to the solenoid valve 560. The higher the current from the ECT-ECU 1020, the higher the hydraulic pressure P (SOL) is output from the solenoid valve 560.

A lock-up control valve 550 selectively applies the secondary pressure P (L/U) to the apply side hydraulic chamber of the torque converter 200 (provided on the pump impeller 220 side) and to the release side hydraulic chamber of the torque converter 200 (defined by the lock-up clutch 210 and a converter cover 260).

In the following description, the lock-up control valve 550 of the hydraulic pressure supply apparatus of this example embodiment of the invention will be described in more detail with reference to FIG. 3. The lock-up control valve 550 has a valve element 600, a first port 611, a second port 612, a third port 613, a fourth port 614, and a drain port 616.

The valve element 600 has a first land 601 and a second land 602. The diameter of the second land 602 is larger than the diameter of the first land 601. The valve element 600 is urged by a spring.

The hydraulic pressure P (SOL) is supplied from the solenoid valve 560 to the first port 611 and to the second port 612. When the hydraulic pressure P (SOL) is not being supplied from the solenoid valve 560 to the lock-up control valve 550, the valve element 600 of the lock-up control valve 550 is moved to the "OFF" position shown in FIG. 3 (the left side of the valve element 600 shown in FIG. 3).

When the valve element 600 is at the "OFF" position, the secondary pressure P (L/U) is supplied to the release side hydraulic chamber ("L/U RELASE") of the torque converter 200 via the third port 613 and the hydraulic pressure in the apply side hydraulic chamber of the torque converter 200 is supplied to an oil cooler (not shown in the drawings), whereby the lock-up clutch 210 is moved away from the converter cover 260. This is how the lock-up clutch 210 is released.

Figure 3:
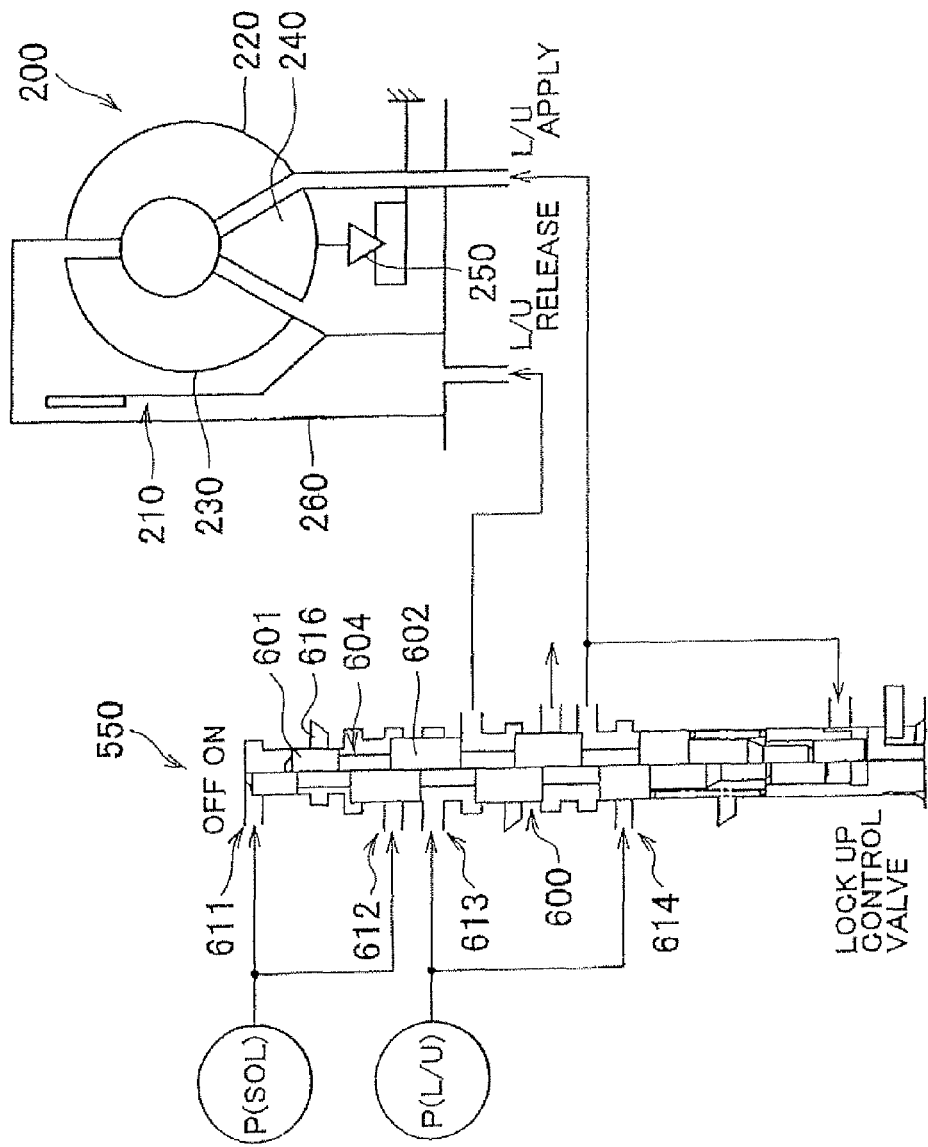
FIG. 3 is a view showing a lock-up control valve of the hydraulic pressure supply apparatus of the example embodiment of the invention.

On the other hand, when the hydraulic pressure P (SOL) is being supplied from the solenoid valve 560 to the lock-up control valve 550, the valve element 600 of the lock-up control valve 550 is moved to the "ON" position shown in FIG. 3 (the right side of the valve element 600 shown in FIG. 3).

When the valve element 600 is at the "ON" position, the secondary pressure P (L/U) is supplied to the apply side hydraulic chamber of the torque converter 200 ("L/U APPLY") via the fourth port 614 and the hydraulic pressure in the release side hydraulic chamber of the torque converter 200 is drained, whereby the lock-up clutch 210 is pressed against the converter cover 260. This is how the lock-up clutch 210 is applied. The apply force (apply pressure) of the lock-up clutch 210 is controlled to a value corresponding to the hydraulic pressure P (SOL) supplied from the solenoid valve 560 to the lock-up control valve 550.

Note that the foregoing hydraulic pressure supply apparatus may alternatively be configured such that the lock-up clutch 210 is applied when the hydraulic pressure P (SOL) is not being supplied from the solenoid valve 560 to the lock-up control valve 550 and that the lock-up clutch 210 is released when the hydraulic pressure P (SOL) is being supplied from the solenoid valve 560 to the lock-up control valve 550.

When the valve element 600 of the lock-up control valve 550 is at the "OFF" position shown in FIG. 3, a space 604 between the first land 601 and the second land 602 is opened to the atmosphere. Therefore, when the valve element 600 is at the "OFF" position, if the hydraulic pressure P (SOL) is supplied from the solenoid valve 560, the supplied hydraulic pressure P (SOL) acts only on the first land 601.

When the valve element 600 of the lock-up control valve 550 is at the "ON" position, the hydraulic pressure P (SOL) that has been output from the solenoid valve 560 is supplied to the space 604 between the first land 601 and the second land 602 via the second port 612. Therefore, when the valve element 600 is at the "ON" position, if the hydraulic pressure P (SOL) is supplied from the solenoid valve 560, the supplied hydraulic pressure P (SOL) acts on both the first land 601 and the second land 602.

Because the diameter of the second land 602 is larger than the diameter of the first land 601, the area on which the hydraulic pressure P (SOL) supplied from the solenoid valve 560 acts when the valve element 600 of the lock-up control valve 550 is at the "ON" position is larger than when the valve element 600 of the lock-up control valve 550 is at the "OFF" position.

According to this structure, the hydraulic pressure needed to maintain the valve element 600 of the lock-up control valve 550 at the "ON" position can be made lower than the hydraulic pressure needed to move the valve element 600 from the "OFF" position to the "ON" position.

As such, the command duty value issued to the solenoid valve 560, that is, the current supplied to the solenoid valve 560 can be lowered. Thus, in operation, after the valve element 600 of the lock-up control valve 550 has been moved from the "OFF" position to the "ON" position by maximizing the current to the solenoid valve 560, the current can be reduced to maintain the valve element 600 at the "ON" position.

According to the hydraulic pressure supply apparatus of the example embodiment as described above, as the hydraulic pressure P (SOL) is supplied from the solenoid valve to the lock-up control valve, the valve element of the lock-up control valve moves from the "OFF" position to the "ON" position. The area on which the hydraulic pressure P (SOL) supplied from the solenoid valve acts when the valve element of the lock-up control valve is at the "ON" position is larger than when the valve element of the lock-up control valve is at the "OFF" position. As such, the hydraulic pressure needed to maintain the valve element of the lock-up control valve at the "ON" position can be made lower than the hydraulic pressure needed to move the valve element of the lock-up control valve from the "OFF" position to the "ON" position. Thus, the hydraulic pressure P (SOL) that is needed to be supplied from the solenoid valve is decreased, and therefore the current needed when the solenoid valve is outputting the hydraulic pressure P (SOL) is decreased accordingly.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A lock-up clutch hydraulic pressure supply apparatus comprising:
an electromagnetic valve that outputs a hydraulic pressure increases as a current supplied to the electromagnetic valve increases; and
a switch valve having a valve element that is moved, in response to the hydraulic pressure supplied from the electromagnetic valve, from a first position at which the supplied hydraulic pressure is sent from the switch valve to the lock-up clutch so as to establish one of an applied state and a released state of the lock-up clutch to a second position at which the supplied hydraulic pressure is sent from the switch valve to the lock-up clutch so as to establish an other of the applied state and the released state of the lock-up clutch,
wherein an area of the switch valve on which the hydraulic pressure supplied from the electromagnetic valve acts when the valve element of the switch valve is at the second position is larger than the area of the switch valve on which the hydraulic pressure supplied from the electromagnetic valve acts when the valve element of the switch valve is at the first position.

2. The lock-up clutch hydraulic pressure supply apparatus according to claim 1, wherein:
the one of the applied state and the released state of the lock-up clutch is the applied state, and the other of the applied state and the released state of the lock-up clutch is the released state.

3. The lock-up clutch hydraulic pressure supply apparatus according to claim 2, wherein:
the valve element of the switch valve has a first land on which the hydraulic pressure supplied from the electromagnetic valve acts when the valve element of the switch valve is at the first position and when the valve element of the switch valve is at the second position and a second land on which the hydraulic pressure supplied from the electromagnetic valve acts when the valve element of the switch valve is at the second position, the first and second lands facing in a same direction, and
a diameter of the second land is larger that a diameter of the first land.

4. The lock-up clutch hydraulic pressure supply apparatus according to claim 3, further comprising:
means for making the current supplied to the electromagnetic valve for maintaining the valve element at the second position smaller than the current supplied to the electromagnetic valve for switching the valve element from the first position to the second position.

5. The lock-up clutch hydraulic pressure supply apparatus according to claim 4, wherein:
the switch valve has: a first port to which the hydraulic pressure is supplied from the electromagnetic valve when the valve element of the switch valve is at the first position and when the valve element is at the second position; and
a second port to which the hydraulic pressure is supplied from the electromagnetic valve when the valve element is at the second position.

6. The lock-up clutch hydraulic pressure supply apparatus according to claim 5, wherein:
the switch valve has a space between the first land and the second land;
when the valve element of the switch valve is at the first position, the space is opened to the atmosphere, and as the hydraulic pressure is supplied from the electromagnetic valve, the hydraulic pressure acts on the first land via the first port; and
when the valve element of the switch valve is at the second position, as the hydraulic pressure is supplied from the electromagnetic valve, the hydraulic pressure is supplied to the space via the second port so that the hydraulic pressure acts on the first land and the second land.

7. The lock-up clutch hydraulic pressure supply apparatus according to claim 1, wherein:
the valve element of the switch valve has a first land on which the hydraulic pressure supplied from the electromagnetic valve acts when the valve element of the switch valve is at the first position and when the valve element of the switch valve is at the second position and a second land on which the hydraulic pressure supplied from the electromagnetic valve acts when the valve element of the switch valve is at the second position, the first and second lands facing in a same direction, and
a diameter of the second land is larger than a diameter of the first land.

8. The lock-up clutch hydraulic pressure supply apparatus according to claim 7, further comprising:
means for making the current supplied to the electromagnetic valve for maintaining the valve element at the second position smaller than the current supplied to the electromagnetic valve for switching the valve element from the first position to the second position.

9. The lock-up clutch hydraulic pressure supply apparatus according to claim 8, wherein:
the switch valve has: a first port to which the hydraulic pressure is supplied from the electromagnetic valve when the valve element of the switch valve is at the first position and when the valve element is at the second position; and
a second port to which the hydraulic pressure is supplied from the electromagnetic valve when the valve element is at the second position.

10. The lock-up clutch hydraulic pressure supply apparatus according to claim 9, wherein:
the switch valve has a space between the first land and the second land;
when the valve element of the switch valve is at the first position, the space is opened to the atmosphere, and as the hydraulic pressure is supplied from the electromagnetic valve, the hydraulic pressure acts on the first land via the first port; and
when the valve element of the switch valve is at the second position, as the hydraulic pressure is supplied from the electromagnetic valve, the hydraulic pressure is supplied to the space via the second port so that the hydraulic pressure acts on the first land and the second land.

* * * * *